United States Patent [19]
Ando

[11] Patent Number: 5,501,427
[45] Date of Patent: Mar. 26, 1996

[54] PLATE VALVE

[75] Inventor: Masayuki Ando, Funabashi, Japan

[73] Assignee: Taimei Kinzoku Kogyo Co., Ltd., Tokyo, Japan

[21] Appl. No.: 350,660

[22] Filed: Dec. 7, 1994

[30] Foreign Application Priority Data

Apr. 28, 1994 [JP] Japan .................................. 6-090860

[51] Int. Cl.$^6$ .............................. F16K 1/18; F16K 31/44
[52] U.S. Cl. .......................................... 251/228; 251/298
[58] Field of Search ...................... 251/228, 229, 251/298

[56] References Cited

U.S. PATENT DOCUMENTS

| | | | |
|---|---|---|---|
| 1,782,238 | 11/1930 | Kirchan | 251/228 |
| 2,389,947 | 11/1945 | Allen | 251/228 |
| 2,535,525 | 12/1950 | Wolfe | 251/228 |
| 2,999,666 | 9/1961 | Sjogren | 251/228 |
| 3,119,594 | 1/1964 | Heggem | 251/228 |
| 3,254,660 | 6/1966 | Ray | 251/228 |
| 3,334,858 | 8/1967 | Hay | 251/228 |
| 3,510,101 | 5/1970 | Burtis | 251/228 |
| 3,539,150 | 11/1970 | Conrad | 251/228 |

FOREIGN PATENT DOCUMENTS

| | | | |
|---|---|---|---|
| 695015 | 12/1930 | France | 251/228 |
| 1231630 | 9/1960 | France | 251/228 |
| 3223174A1 | 12/1983 | Germany | |
| 0003093 | 1/1894 | United Kingdom | 251/228 |
| 304837 | 1/1929 | United Kingdom | |

OTHER PUBLICATIONS

Tokico MT Series Cutoff Valves for Gas Supply Equipment, Cat. No. M1303–02, pp. 1–8 (Japanese publication with English language summary translation).

*Primary Examiner*—George L. Walton
*Attorney, Agent, or Firm*—Heslin & Rothenberg

[57] ABSTRACT

A valve appropriate for both shut-off and flow regulation operations is disclosed here. The valve is easy to handle, suffers from low flow resistance in its fully opened state, and offers excellent choking performance. A variety of sizes of the valve can be manufactured in a low-cost manner. The valve comprises a valve seat disposed in the midway of flow passages, and a valve casing which houses the valve seat and the valve element inside. The valve seat has a tilt angle with respect to the direction of the flow of a fluid. The valve element comprises a planar plate as its substrate, and an elongated hole on the back portion of the planar plate. The valve element is held at an initial tilt angle, smaller than the tilt angle of the valve seat, with respect to the direction of the flow of the fluid. A control rod is operative so that the valve element increases its tilt angle from its initial tilt angle. When the valve element touches one end portion of the valve seat, the valve element rotates about one end portion until the valve element is places close to the valve seat or in seal engagement with the valve seat.

16 Claims, 6 Drawing Sheets

PLATE VALVE

BACKGROUND OF THE INVENTION

1. Field of the Invention

The present invention relates to a plate valve disposed in the midway of a flow passage, and, more particularly, to a plate valve which has shut-off and regulating functions working either in normal or in emergency state.

2. Description of the Related Art

A diversity of valve types disposed in the midway of a flow passage are known. One of the types is a globe valve which has typically a spherical casing, wherein the center line of its inlet passage is aligned with the center line of its outlet passage, and the flow of the fluid is curved in an S-shaped figure. The globe valve is a valve type that limits the fluid flow by checking directly the fluid flow. The advantage of this valve is that with its reliable choking capability, the valve regulates accurately the fluid flow, and that a compact design is easy to implement. The disadvantages of the globe valve: because of its construction, the valve needs a large handling torque, and thus a large size valve is not practicable; and a resulting flow resistance is large.

Another type of valve is a sluice valve (gate valve) which shuts off the fluid flow in a piping system. In this valve, a disk-like valve element closes the flow passage to shut off the fluid flow. The sluice valve is a valve for an on-off valving operation. The advantages of this valve: When it is fully opened, flow resistance is extremely small; a large diameter valve can be manufactured; and the handling torque for open and close operations is smaller than that for the globe valve. The disadvantages of the sluice valve are as follows: in its partially opened state, the valve suffers from eddied flow behind the valve element, giving rise to a large flow resistance and further causing the valve element to vibrate and then wear. The sluice valve thus is not appropriate to regulation of fluid flow. Furthermore, in its construction, the sluice valve has a long handling stroke for opening and closing operations, leading to a long opening or closing time involved. The sluice valve is thus not suitable for quick opening or closing valving application. Its small-sized versions are difficult to manufacture.

Another type of valve is a check valve. The check valve limits reverse flow from the downstream to the upstream of a flow passage because of back pressure. It automatically and quickly blocks reverse flow.

These three valves have their own advantages and disadvantages as described above. There has not been available the valve which offers functions and advantages of these valve combined.

SUMMARY OF THE INVENTION

The object of the present invention is to provide a plate valve which offers functions and advantages of the globe valve, sluice valve and check valve combined. More particularly, the plate valve according to the present invention shuts off the flow passage in an emergency situation, and, in normal operation, regulates the flow of a fluid and checks reverse flow. Furthermore, the plate valve according to the present invention is easy to use, minimizes a flow resistance in its fully opened state, and offers a stable choking capability. Furthermore, the valve according to the present invention is manufactured in low cost, and is available in a variety of sizes.

According to one aspect of the present invention, the plate valve comprises a valve casing that defines a flow passage that allows a fluid to flow in a single direction, a valve seat disposed in the middle of the flow passage, a valve element which is in engagement with or out of engagement with the valve seat to shut off the flow passage or regulate the flow of the fluid, and a control rod coupled to the valve element and vertically movable inside the valve casing, for engaging the valve element with the valve seat or disengaging the valve element from the valve seat, whereby the valve seat is tilted at a tilt angle with respect to the direction of the fluid flow, the valve element comprising a planar plate being in or out of engagement with the valve seat and an elongated hole disposed on the back of the planar plate is set to an initial tilt angle, less than the tilt angle of the valve seat, with respect to the direction of the fluid flow, the control rod rotatably supports the valve element in the direction that the tilt angle of the valve element increases from the initial tilt angle, and the operation of the control rod allows the valve element to touch the valve seat at its one end portion, and to rotate about said one end portion of the valve seat so that the valve element is placed close to the valve seat or fully engaged with the valve seat.

According to another aspect of the present invention, the plate valve comprises a valve casing that defines a flow passage that allows a fluid to flow in a single direction, a valve seat disposed in the middle of the flow passage, a valve element which is in engagement with or out of engagement with the valve seat to shut off the flow passage or regulate the flow of the fluid, and a control rod coupled to the valve element and vertically movable inside the valve casing, for engaging the valve element with the valve seat or disengaging the valve element from the valve seat, whereby the valve seat is tilted at a tilt angle with respect to the direction of the fluid flow, the valve element comprises a planar plate being in or out of engagement with the valve seat and an elongated hole disposed on the back of the planar plate, the valve element is connected to the control rod by means of a connecting member that connects a first axis disposed at one end of the control rod to a second axis that is received in the elongated hole, and the second axis is positioned downstream of the flow passage with respect to the center axis of the control rod when the control rod operates to put the valve element into seal engagement with the valve seat.

In the first aspect of the present invention, a fluid flows without flow resistance when the valve element is outside the flow passage. The control rod is operated so that the valve element gradually closes the flow passage to regulate the fluid flow. The valve element is held at the initial tilt angle until it touches one end portion of the valve seat. When the control rod is further lowered, the valve element rotates about the one end of the valve seat in the direction that the valve element increases its tilt angle with respect to the direction of the fluid flow. As a result, the fluid flow in the flow passage is gradually choked. When the control rod is further lowered, the valve element slides down the one end portion of the valve seat using that end portion as its support so that the valve element fully closes the opening of the valve seat. When the control rod is yet further lowered, engagement of the valve element with the valve seat is more secure, achieving a complete shutoff of the opening of the valve seat and preventing reverse flow.

In the second embodiment of the present invention, when the control rod is operated, the valve element rotates about an axis disposed in the vicinity of one end of the valve seat in the direction that its tilt angle increases from the initial tilt angle, so that the fluid flow is chocked. When the control rod is further lowered, the valve element is put into full engagement with the valve seat to close the opening of the valve seat. When the control is yet further lowered, the engagement of the valve element with the valve seat is tightened to completely shut off the flow passage and to prevent reverse flow. Thus, the valving operation is reliable.

Since the valve element can be put into engagement with the valve seat against dynamic pressure of the fluid, the valve element is installed in the flow passage of the valve without paying consideration to difference between reverse flow and direct flow.

In the above plate valve, the inner wall of the valve casing that defines the flow passage is linear along the flow of the fluid, and thus no sediment in the fluid builds up on the inner wall, and sealing engagement between the valve element and the valve seat is not impaired.

The plate valve according to the present invention is advantageously used for the shut-off function in an emergency situation and in the regulation function of fluid flow in normal operating conditions. The plate valve offers the ease of opening and closing operations, a small flow resistance in its fully opened state, and an excellent choking capability. Furthermore, a variety of sizes can be manufactured in a low-cost manner.

A more complete understanding of the present invention can be obtained by reference to the following detailed description of the preferred embodiments thereof in connection with the attached drawings.

DETAILED DESCRIPTION OF THE PREFERRED EMBODIMENTS

Figure 1:
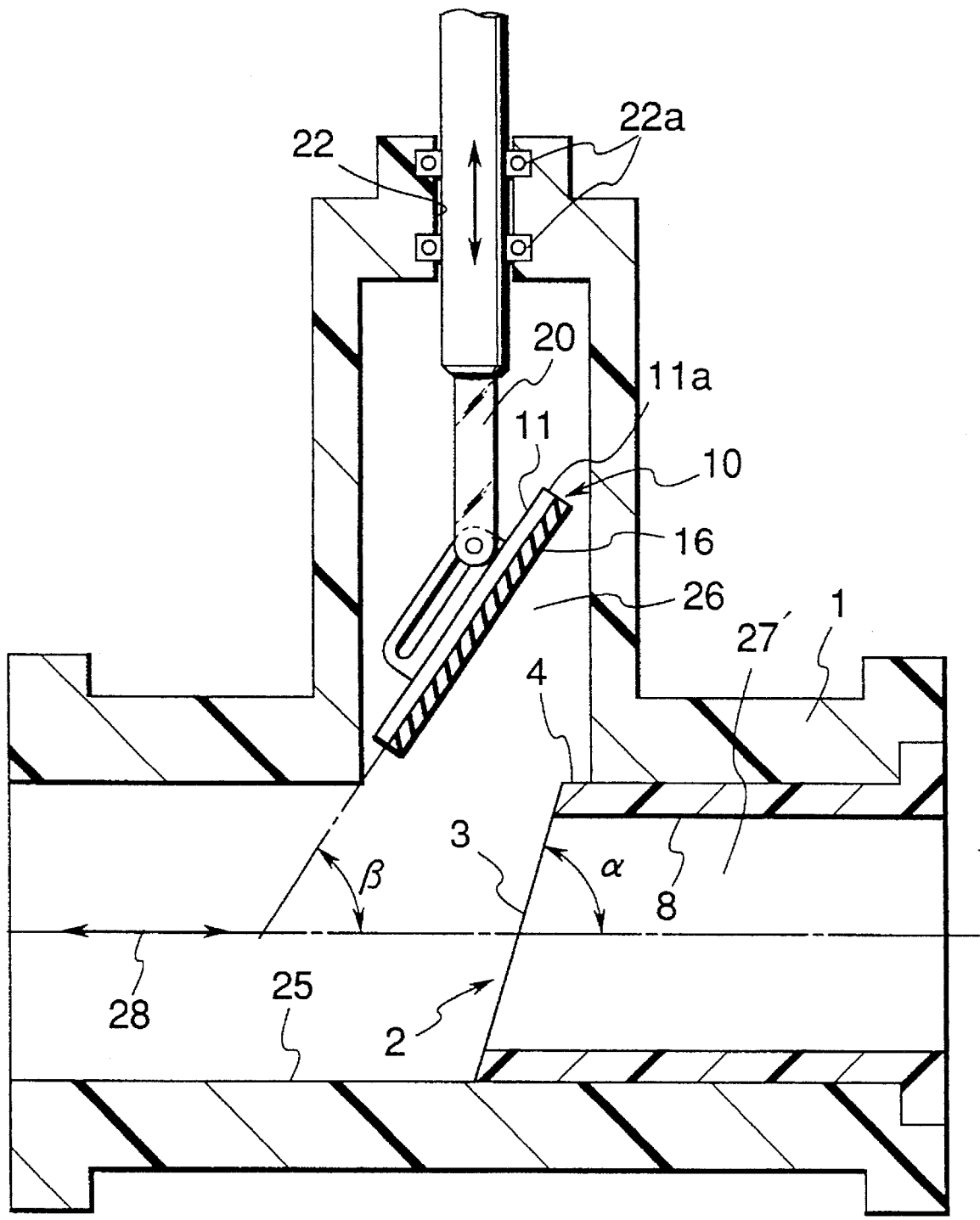
FIG. 1 is a cross-sectional view showing a first embodiment of the plate valve according to the present invention.

Referring to FIG. 1, the first embodiment of the plate valve according to the present invention comprises a T-shaped valve casing 1 formed of horizontal flow passages 27, 27' of a fluid and a vertically extending hollow cylinder portion 26. The plate valve also comprises a valve seat 2 in the middle portion between the flow passages 27, 27', and a valve element 10 that is in or out of engagement with the valve seat 2 to shut off the flow passages 27, 27' or regulate the flow of the fluid. A sleeve 8 is inserted into the inside of a horizontal portion of the valve casing 1, and the inner end of the sleeve 8 constitutes the valve seat 2 which is tilted at a tilt angle α with respect to the direction 28 of the fluid flow. The valve seat 2 has an opening face 3 toward a single direction of the fluid flow. The tilt angle α is preferably between 75° and 85°.

The valve element 10 comprises a planar plate 11 that is put into or out of engagement with the valve seat 2, and the planar plate 11 has an elongated hole 13 on its back portion. The valve element 10 is supported at the elongated hole 13 by a control rod 30 that is inserted from above into the valve casing. The planar plate 11 is constructed of a metal or other rigid material, and the surface facing the valve seat 2 is coated with elastic material 16, such as rubber, Teflon, which provides a seal, using baking, adhesion, or other technique. The elastic seal material 16 may be attached onto the valve seat 2 rather onto the valve element 10.

The valve element 10 is supported at one end 13a of the elongated hole 13 by the control rod 20 using a pin or the like in a manner that the valve element 10 is counterclockwise rotatable in FIG. 1, namely, in the direction that the tilt angle of the valve element 10 increases from its initial angle. The control rod 20 that is vertically movably supported by an unshown control means moves to the fluid flow 28. The downward movement of the control rod 20 lowers the valve element 10.

A support portion 22 is disposed on the top of the valve casing 1 to support the control rod 20. The support portion 22 is provided with O-rings 22a to prevent the fluid from leaking out and to restrict a horizontal motion of the control rod 20 in the direction 28 of the fluid flow. O-rings 22a are determined considering the type of the fluid, level of its pressure and its temperature. In the vertically downward movement of the valve element 10 by the control rod 20, namely in the vertically downward direction in FIG. 1, the valve element 10 keeps its initial tilt angle β, which is less than the tilt angle α of the valve seat, with respect to the direction of the fluid flow until the valve element 10 touches one end portion 4 of the valve seat 2. The initial tilt angle β is kept constant until the valve element 10 touches one end portion 4 of the valve seat 2. The valve element 10 touches the valve seat 2, and thereafter, the tilt angle of the valve element 10 gradually increases and finally reaches the same angle as that of the valve seat 2, namely angle α. The initial tilt angle β is preferably within the range from 65° to 80°, and is smaller than the tilt angle α. The tilt angle α and the initial tilt angle β are appropriately determined considering the type of the fluid, its pressure and temperature.

Figure 2:
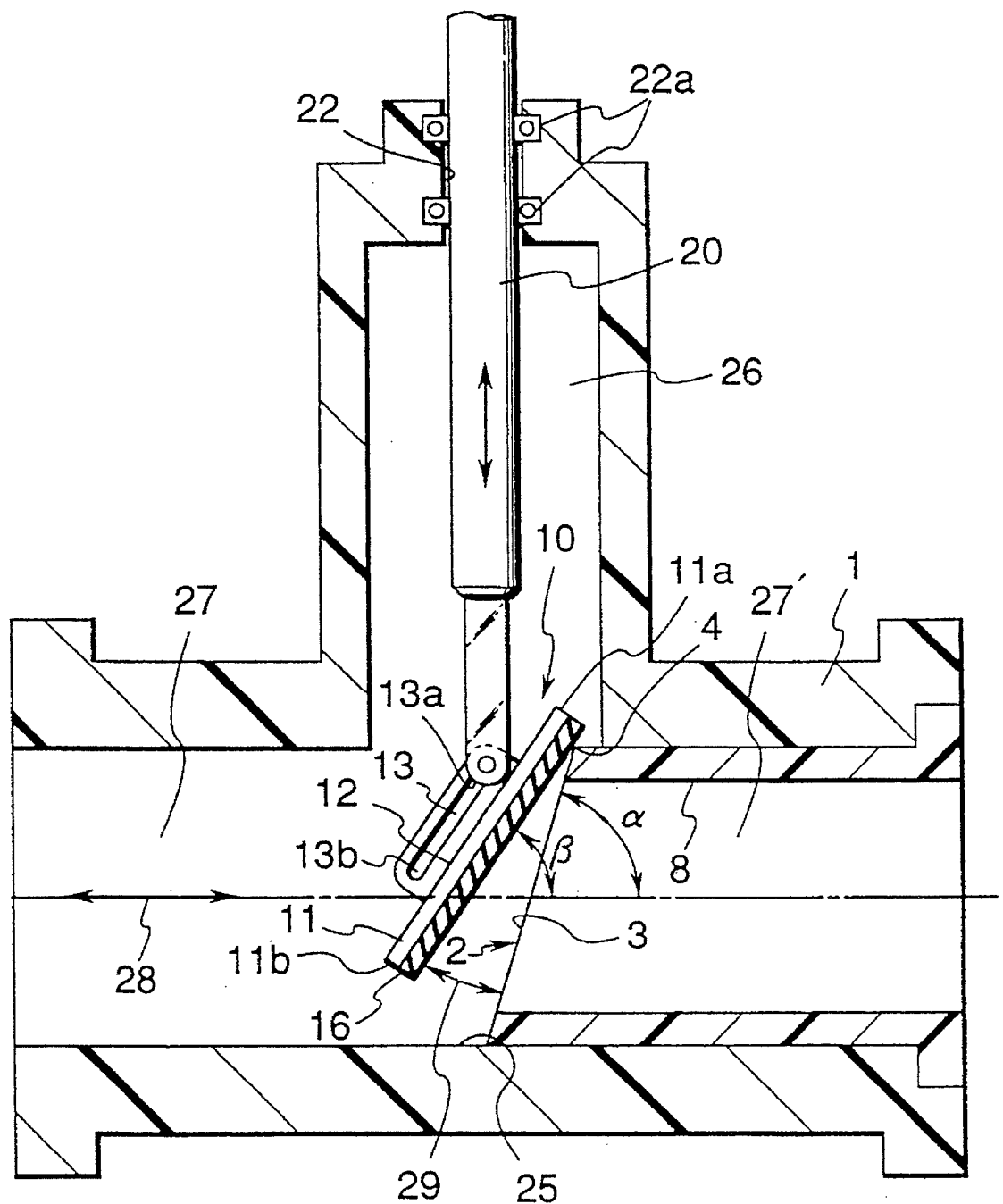
FIG. 2 is a cross-sectional view showing the state in which a valve element touches one end point of a valve seat in the embodiment of FIG. 1.
Figure 3:
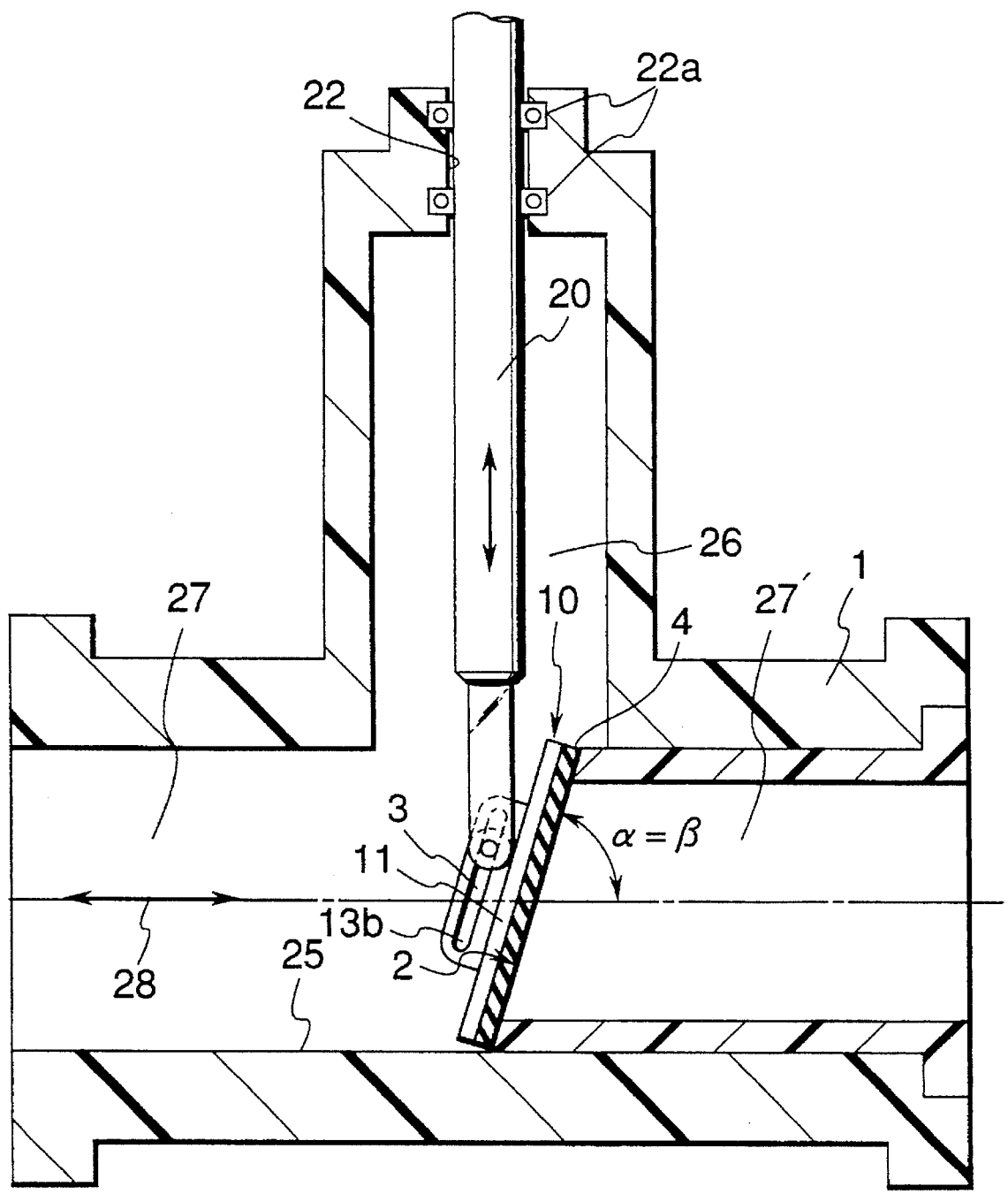
FIG. 3 is a cross-sectional view showing the state in which the valve element is in full engagement with the valve seat to shut off their flow passage in the embodiment of FIG. 1.

Discussed next is the operation of the first embodiment of the plate valve, constructed as above, according to the present invention. In FIG. 1 through FIG. 3, when the plate valve is fully opened, the valve element 10 is retracted in a space 26 which is a recess from the fluid flow, and keeps its initial tilt angle β. The fluid now flows from the flow passage 27 to the flow passage 27' with a minimum flow resistance involved. To regulate the fluid flow, the unshown control means moves the control rod 20 in the downward direction in the figures. The lower end 11b of the planar plate 11 comes into the flow passage 27, and thereafter, flow resistance in the flow passage starts increasing and flow regulation now starts. When the control rod 20 is further lowered, one end portion 11a of the planar plate 11 touches one end portion 4 of the valve seat 2 as shown in FIG. 2. The fluid flow is now substantially choked, but resulting flow resistance is still relatively small.

When the control rod 20 is further lowered, a pin 23 disposed on the lower end of the control rod 20 slides from one end 13a toward the other end 13b of the elongated hole 13; and the valve element 10 slides on one end portion 4 as its support, causing the tilt angle β of the planar plate 11 to near the angle α. When the control rod 20 is still further lowered, the tilt angle β of the planar plate 11, thus, the valve element 10, comes equal to the tilt angle α, and the valve element 10 is fully engaged with the valve seat 2 as shown in FIG. 3. Although, in this state, pressure of the fluid on the flow passage 27 presses the valve element 10 against the valve seat 2, engagement of the valve element 10 with the valve seat 2 is even further tightened to completely shut off the fluid flow if the control rod 20 is yet further lowered. In the first embodiment of the plate valve 1, the control rod 20 is designed considering the type of the fluid, its pressure and temperature. For example, assuming a fluid pressure of 250 mmAq and size of 75 A for flow passages 27, 27', the vertical actuating force of the control rod 20 is relatively as small as about 1.1 kgf.

The operation of the embodiment of the plate valve 1 according to the present invention is further discussed below. When the valve element 10 is tightly engaged with the valve seat 2 as in FIG. 3, the valve element 10 prevents reverse flow even if the fluid pressure on the flow passage 27' exceeds the fluid pressure on the flow passage 27 for some reason. Namely, the plate valve performs the same function as that of a conventional check valve. When the fluid flows from the flow passage 27' to the flow passage 27, the manipulation of the control rod 20 for tighter engagement allows the valve element 10 to limit the fluid flow. The plate valve, thus, performs the same function at that of a conventional globe valve. The first embodiment of the plate valve has thus globe and check valve functions combined, and further tight engagement function.

In the first embodiment of the plate valve, the shapes of the opening of the valve seat and the valve element plate may be any form. Preferably, the sleeve 8 is a cylinder that has a slantly cut end on one side, and the resulting opening 3 of the valve seat is elliptical. The valve element plate 11 is designed to match the elliptical opening 3. The plate valve processed as above permits a low-cost and high-accuracy manufacturing.

Figure 4:
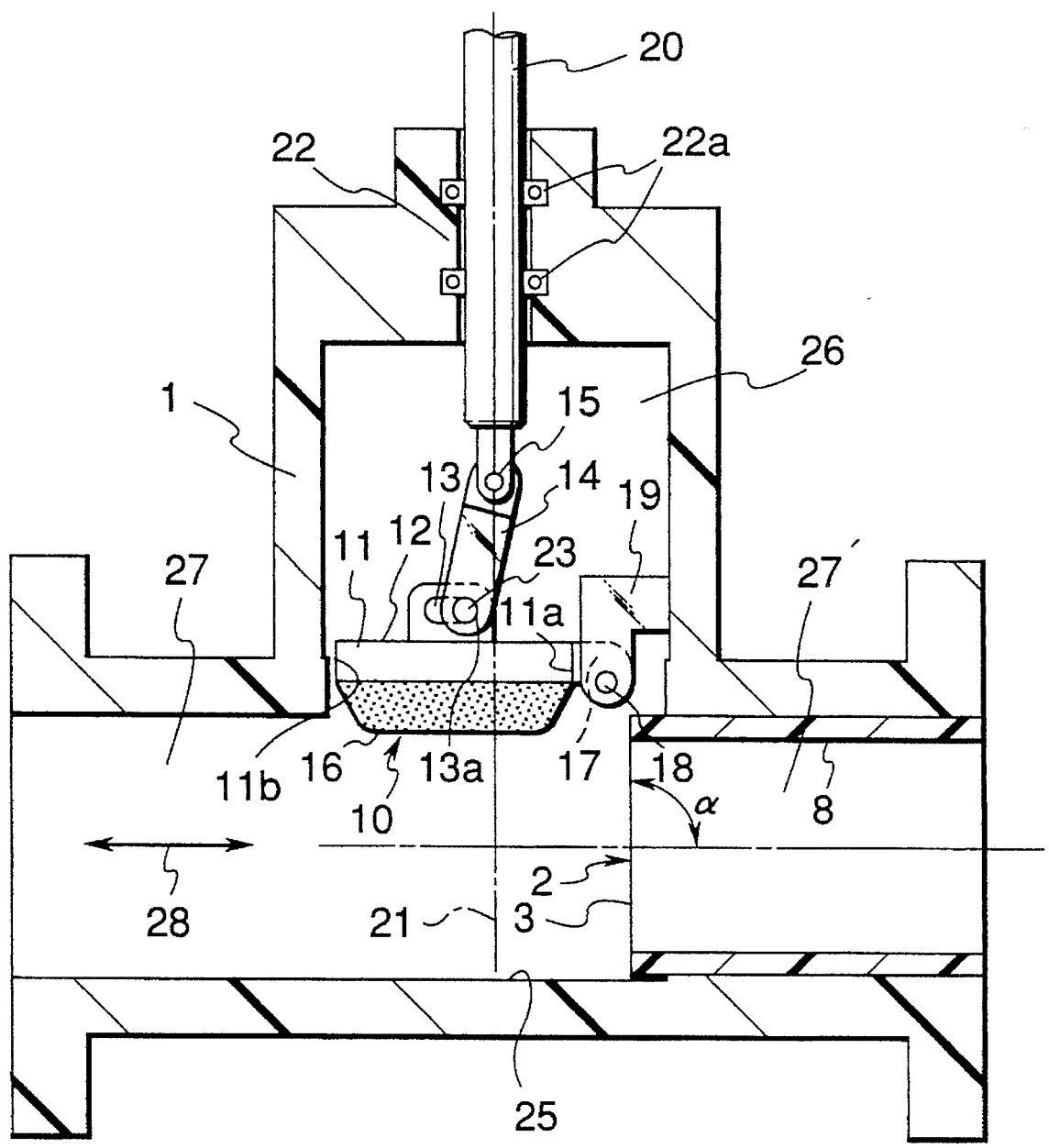
FIG. 4 is a cross-sectional view showing a second embodiment of the plate valve according to the present invention, with its valve element fully opened.
Figure 5:
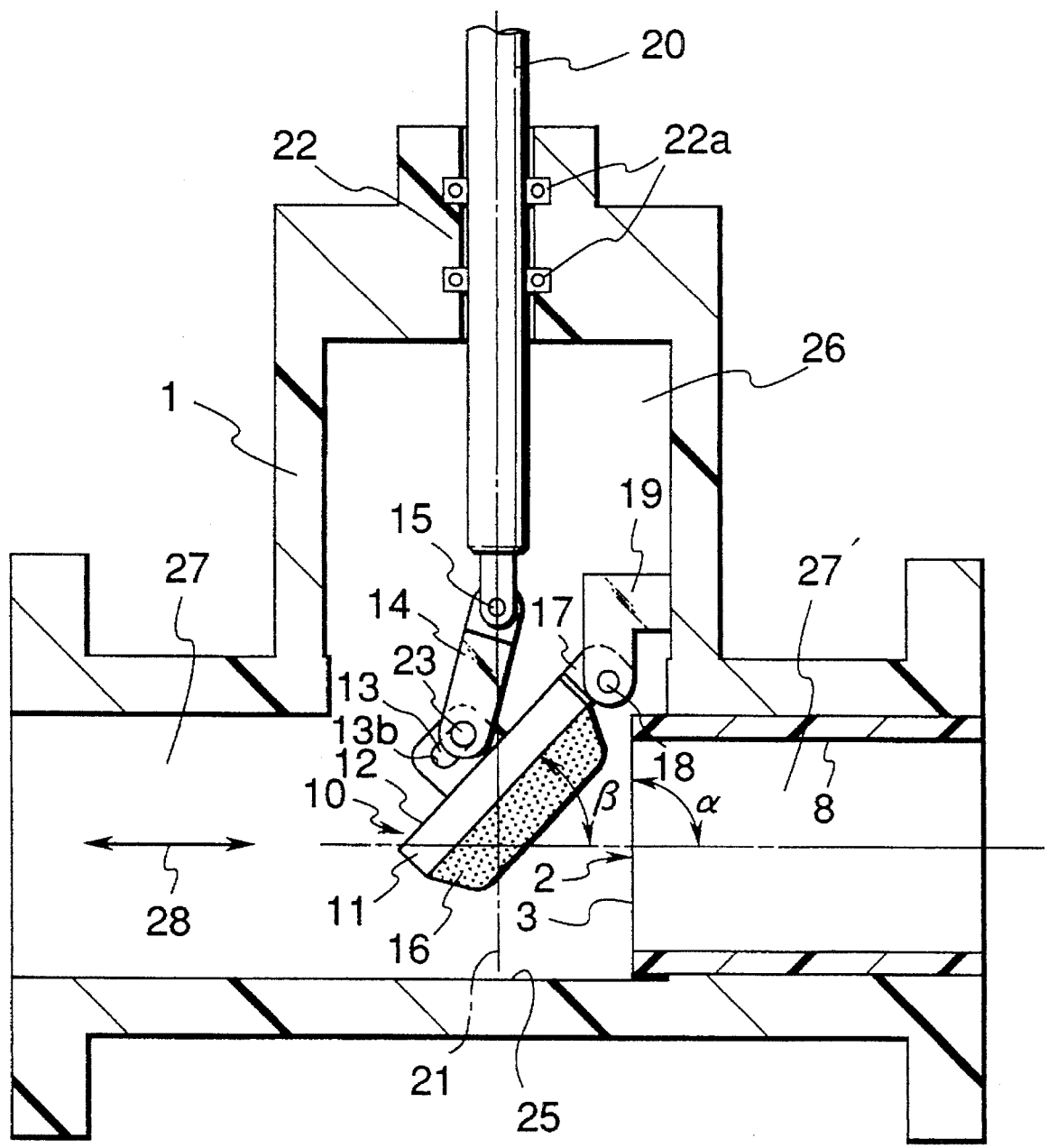
FIG. 5 is a cross-sectional view showing the state in which the valve element is half-opened in the embodiment of FIG. 4.
Figure 6:
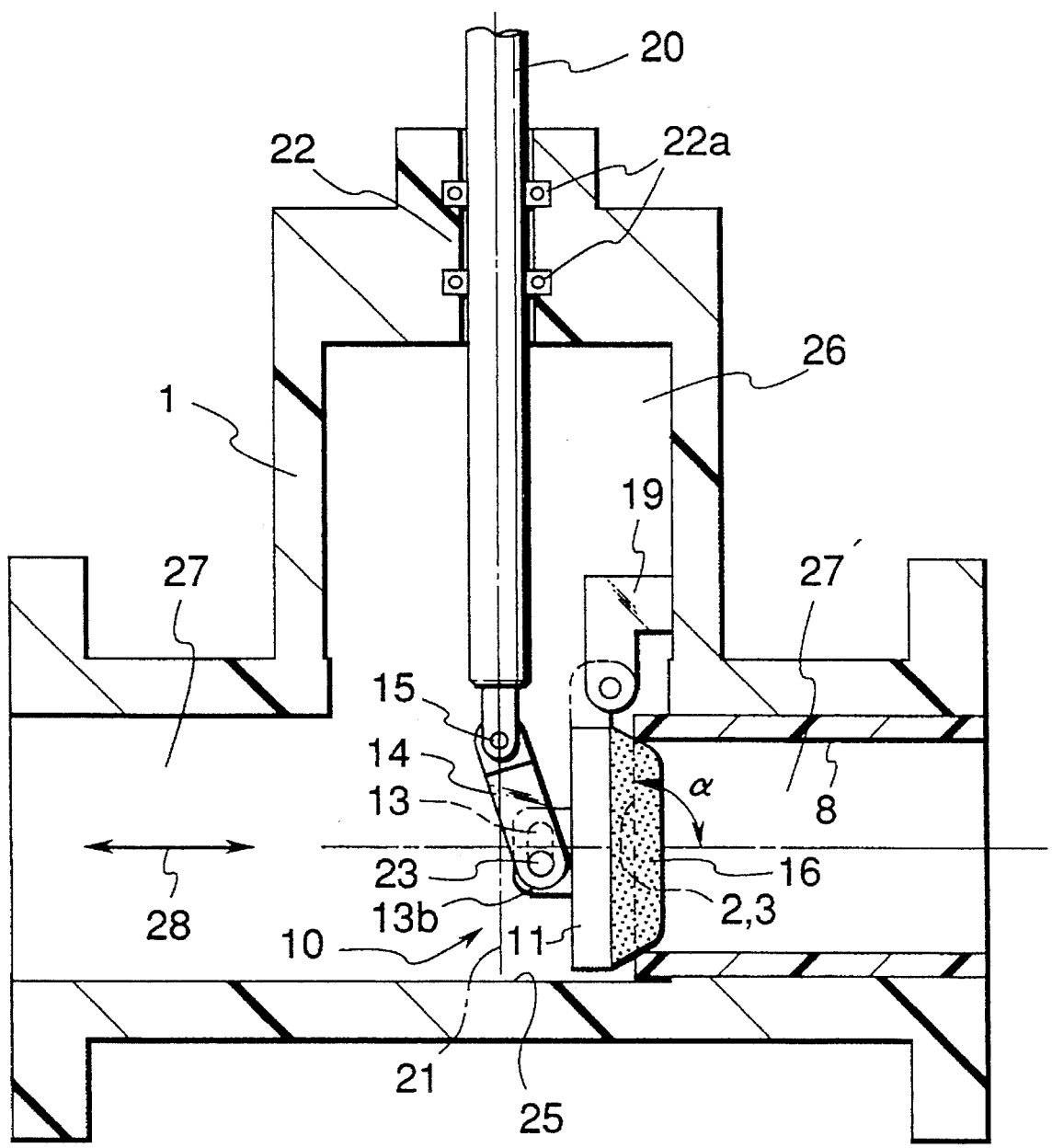
FIG. 6 is a cross-sectional view showing that the flow passage is completely shut off with the valve element fully engaged with the valve seat in the embodiment of FIG. 4.

FIG. 4 through FIG. 6 show the second embodiment of the plate valve according to the present invention. Those components equivalent to those described with reference to the first embodiment in function and structure are designated with the same reference numerals. The second embodiment differs from the first embodiment in that the second embodiment is provided with a connecting rod between the control rod and the valve element and in that a flange portion is extended from an end of the valve element plate and an axis supported by the valve casing is inserted through the hole disposed in the flange portion. In FIG. 4, the plate valve comprises the valve element 10 in or out of engagement with the valve seat 2 for shutting off the flow passages 27, 27' or for regulating the fluid flow through the passages 27, 27' and the valve seat disposed on the inner end of the sleeve 8. The valve seat has a tilt angle α with respect to the direction of the fluid flow 28 and its opening faces one direction of the fluid flow 28. In this embodiment, the tilt angle α is 90°.

The valve element 10 comprises a planar plate 11, and the planar plate 11 has an elongated hole 13 on its back portion 12. The valve element 10 is connected to the control rod 20 by means of the connecting rod 14 that connects the control rod 20 at its end by an axis 15, to the valve element 10 at one end 13a of the elongated hole 13 by a pin 23 as an axis. The valve element 10 has a flange portion 17 extended from one end 11a of the valve element plate 11. The valve casing 1 has a bracket 19 in the vicinity of the flange portion 17. An axis 18 is inserted through the holes disposed in the flange portion 17 and the bracket 19 so that the valve element 10 is rotatably supported about the axis 18. Although the initial tilt angle β of the valve element plate 11 (FIG. 5) is set to 0° in the second embodiment, it may be set to an acute angle as in the first embodiment.

The planar plate 11 is constructed of a metal or other rigid material, and the surface facing the valve seat 2 is coated with elastic material 16, such as rubber, Teflon, which provides a seal, using baking, adhesion, or other technique. The elastic seal material 16 may be attached onto the valve seat 2 rather onto the valve element 10.

The control rod 20 that is vertically movably supported by an unshown control means moves to the fluid flow 28. The downward movement of the control rod 20 rotates the valve element 10 about the axis 18 by means of the connecting rod 14. The support portion 22 of the valve casing 1 that supports the control rod 20 is provided with O-rings 22a to prevent the fluid from leaking out and to restrict a horizontal motion of the control rod 20 in the direction 28 of the fluid flow. O-rings 22a are determined considering the type of the fluid, and its pressure and temperature. The valve element 10 is rotated about the axis 18, and its tilt angle β with respect to the direction of the fluid flow 28 remains smaller than the tilt angle of the valve seat, namely, 90° in this embodiment, until the valve element 10 is engaged with the valve seat 2. When the valve element 10 is engaged with the valve seat 2, the tilt angle of the valve element 10 comes equal to the tilt angle of the valve seat 2. The tilt angle α and the initial tilt angle β are properly determined considering the type of the fluid, its pressure, density, flow velocity, and size of plate valve.

The operation of the second embodiment of the plate valve according to the present invention is as follows. In FIG. 4 through FIG. 6, when the plate valve is fully opened, the valve element 10 is retracted in a space 26 which is a recess from the fluid flow, and keeps its initial tilt angle β, 0° in this embodiment. The fluid now flows from the flow passage 27 to the flow passage 27' with a minimum flow resistance involved. To regulate the fluid flow, the unshown control means moves the control rod 20 in the downward direction in FIG. 4. The valve element 10 rotates about the axis 18. The lower end 11b of the planar plate 11 comes into the flow passage 27, and thereafter, flow resistance in the flow passage starts increasing and flow regulation now starts. When the control rod 20 is further lowered, the valve element 10 further rotates about the axis 18 (FIG. 5). The fluid flow is now substantially choked, but resulting flow resistance is still relatively small.

When the control rod 20 is yet further lowered, the support pin 23 of the connecting rod 14 that is connected to the control rod 20 by the axis 15 is shifted from one end 13a of the elongated hole 13 toward the other end 13b of the elongated hole 13, the tilt angle β of the planar plate 11 nears the tilt angle α. When the control rod 20 is still further lowered, the tilt angle β of the planar plate 11 comes equal to the tilt angle α, and the valve element 10 is engaged with the valve seat 2. The valve element 10 is now in seal engagement with the valve seat 2 because of pressure of the fluid on the flow passage 27. Since the pin 23 is now positioned downstream from the center axis 21 of the control rod 20, namely, positioned on the right-hand side of the center axis 21 in FIG. 6, a further lowering of the control rod 20 tightens seal engagement between the valve element 10 and the valve seat 2, completely shutting off the fluid flow. In this plate valve 1 according to the present invention, as in the first embodiment, the vertical actuating force of the control rod 20 is relatively as small as about 1.1 kgf, assuming a fluid pressure of 250 mmAq and size of 75 A for flow passages 27, 27'.

The operation of the second embodiment of the plate valve 1 according to the present invention is further discussed below. When the valve element 10 is tightly engaged with the valve seat 2 as in FIG. 6, the valve element 10 prevents reverse flow even if the fluid pressure on the flow passage 27' exceeds the fluid pressure on the flow passage 27 for some reason. Namely, the plate valve performs the same function as that of a conventional check valve. The valve element 10 rotates further toward the valve seat 2 and reaches a seal engagement with the valve seat 2 to shut off the opening between the flow passage 27 and the flow passage 27'. The plate valve, thus, performs the same function at that of a conventional sluice valve. When the fluid flows from the flow passage 27' to the flow passage 27, the manipulation of the control rod 20 for tighter engagement allows the valve element 10 to limit the fluid flow. The plate valve, thus, performs the same function at that of a conventional globe valve. The plate valve according to the present invention has thus functions of the conventional globe valve, sluice valve and check valve, and further tight engagement function.

In the second embodiment of the plate valve 1, the shapes of the opening 3 of the valve seat 2 and the valve element plate 11 may be any form. Preferably, the sleeve 8 is a cylinder that has a slantly cut end on one side, and the resulting opening 3 of the valve seat 2 is elliptical. The valve element plate 11 is designed to match the elliptical opening 3. The plate valve processed as above permits a low-cost and high-accuracy manufacturing.

In the first and second embodiments of the present invention, the inner wall 25 of the horizontal portion of the valve casing 1 that defines the flow passage is linear along the direction 28 of the flow of the fluid, and the fluid constantly flows in the flow direction in the vicinity of the inner wall 25 of the horizontal portion of the valve casing 1. Thus no sediment in the fluid builds up on the inner wall, and sealing engagement between the valve element 10 and the valve seat 2 is not impaired.

Although the present invention has been discussed in connection with the illustrated embodiments in detail, it will be understood that the present invention is not limited to the above embodiments and that various modifications and changes are made without departing from the scope and spirit of the present invention.

What is claimed is:

1. A plate valve comprising:

a valve casing defining a flow passage, and further defining a valve element recess, and further defining an opening between said flow passage and said valve element recess;

a valve seat disposed in said flow passage of said valve casing at a first angle with respect to a line of flow through said flow passage, and having a portion extending into said opening between said flow passage and said valve element recess;

a valve element having a back portion, and having a base portion for engaging said valve seat to prevent flow through said flow passage;

a control rod disposed in said valve element recess and passing through an aperture in said valve casing, said control rod being moveable in an axial direction;

support means pivotally joining said control rod to said valve element at said back portion, said valve element being freely suspended by said control rod at said back portion, said base portion being engageable with said valve seat through axial movement of said control rod toward said flow passage;

said valve element being suspended by said control rod at a second angle with respect to the line of flow through said flow passage when said valve element is positioned at least partially within said valve element recess and is not in contact with said valve seat, said second angle being less than said first angle;

whereby axial movement of said control rod toward said flow passage causes said valve element to contact and pivot about said portion of said valve seat which extends into said opening when said valve element is positioned substantially within said flow passage.

2. The plate valve of claim 1, wherein said support means comprises an elongated hole defined by said back portion of said valve element, and pin means for pivotally joining said control rod and said back portion at said elongated hole, said pin means being slidable within said elongated hole.

3. The plate valve of claim 1, wherein said valve element recess is sufficiently large to permit the complete withdrawal of said valve element from said flow passage.

4. The plate valve of claim 1, wherein said first angle of said valve seat is within the range of 75 degrees to 85 degrees, and said second angle of said valve element is within the range of 65 degrees to 80 degrees.

5. The plate valve of claim 1, further comprising a sleeve disposed coaxially within said valve casing, said sleeve defining a portion of said flow passage and an end of said sleeve defining said valve seat.

6. The plate valve of claim 5, wherein said valve element recess is sufficiently large to permit the complete withdrawal of said valve element from said flow passage defined by said sleeve.

7. The plate valve of claim 1, wherein said valve element recess is cylindrical and orthogonal with respect to the line of flow through said flow passage.

8. The plate valve of claim 1, wherein said control rod is oriented orthogonally with respect to the line of flow through said flow passage.

9. A plate valve comprising:

a valve casing defining a flow passage, and further defining a valve element recess;

a valve seat disposed in said flow passage of said valve casing at a first angle with respect to a line of flow through said flow passage;

a control rod disposed in said valve recess and passing through an aperture in said valve casing, said control rod being axially moveable;

a valve element comprising a back portion defining an elongated hole, and further comprising a base portion for engaging said valve seat to prevent flow through said flow passage;

said control rod and said valve element being joined by a single connecting rod means pivotally joined by a first pin means at a first end to an end of said control rod means, and pivotally joined by a second pin means at a second end to said valve element at said elongated hole; and, bracket means connecting said valve element at a peripheral portion of said valve element to said valve casing means for pivotal movement thereof;

whereby axial movement of said control rod produces pivotal movement of said connecting rod at said first pin means and at said second pin means within said elongated hole, thereby producing pivotal movement of said valve element between a fully open position, in which said valve element is disposed substantially within said recess, and a fully closed position, in which said valve element engages said valve seat and is disposed substantially within said flow passage, and through an intermediary range of partially open positions, in which said valve element is disposed partly within said recess and partly within said flow passage.

10. The plate valve of claim 9, wherein said valve element comprises a flange portion which is pivotally connected to said bracket means.

11. The plate valve of claim 9, wherein said first angle of said valve seat with respect to the line of flow through said flow passage is 90 degrees.

12. The plate valve of claim 9, wherein said valve element may be pivoted such that the angle of said base portion with respect to the direction of flow through said flow passage is 0 degrees.

13. The plate valve of claim 9, wherein said valve element recess is sufficiently large to permit the complete withdrawal of said valve element from said flow passage defined at said valve seat.

14. The plate valve of claim 9, further comprising a sleeve disposed within said valve casing, said sleeve defining a portion of said flow passage and an end of said sleeve defining said valve seat.

15. The plate valve of claim 14, wherein said valve element recess is sufficiently large to permit the complete withdrawal of said valve element from the flow passage defined by said sleeve.

16. The plate valve of claim 9, wherein said valve casing defines a cylindrical flow passage.

* * * * *

UNITED STATES PATENT AND TRADEMARK OFFICE
CERTIFICATE OF CORRECTION

PATENT NO. : 5,501,427
DATED : March 26, 1996
INVENTOR(S) : Masayuki Ando

It is certified that error appears in the above-indentified patent and that said Letters Patent is hereby corrected as shown below:

Column 8, the last paragraph of claim 1 should read:

whereby axial movement of said control rod toward said flow passage causes a portion of said base portion of said valve element disposed in said opening to contact said valve seat and pivot said valve element to a closed position solely about said portion of said valve seat which extends into said opening when said valve element is positioned substantially within said flow passage.

Signed and Sealed this

Fourth Day of February, 1997

Attest:

BRUCE LEHMAN

*Attesting Officer*  *Commissioner of Patents and Trademarks*